(12) United States Patent
Cai et al.

(10) Patent No.: US 10,346,466 B2
(45) Date of Patent: Jul. 9, 2019

(54) METHODS AND SYSTEMS OF PERSONALIZED PHOTO ALBUMS BASED ON SOCIAL MEDIA DATA

(71) Applicant: International Business Machines Corporation, Armonk, NY (US)

(72) Inventors: Ke Ke Cai, Beijing (CN); Dong Xu Duan, Beijing (CN); Changhua Sun, Beijing (CN); Li Zhang, Beijing (CN); Shi Wan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 72 days.

(21) Appl. No.: 15/131,324

(22) Filed: Apr. 18, 2016

(65) Prior Publication Data

US 2017/0300782 A1 Oct. 19, 2017

(51) Int. Cl.
| | |
|---|---|
| *G06K 9/00* | (2006.01) |
| *G06F 16/58* | (2019.01) |
| *G06T 11/60* | (2006.01) |
| *G06F 16/51* | (2019.01) |
| *G06F 16/583* | (2019.01) |
| *G06K 9/32* | (2006.01) |

(52) U.S. Cl.
CPC .......... *G06F 16/5866* (2019.01); *G06F 16/51* (2019.01); *G06F 16/5846* (2019.01); *G06K 9/00677* (2013.01); *G06K 9/3266* (2013.01); *G06T 11/60* (2013.01); *G06K 2209/01* (2013.01)

(58) Field of Classification Search
CPC .......... G06K 9/00–82; G06F 17/30253; G06F 17/30268; G06F 17/3029; G06T 11/60
See application file for complete search history.

(56) References Cited

U.S. PATENT DOCUMENTS

| 8,934,661 B2 | 1/2015 | Dolson et al. | |
| 9,691,008 B2* | 6/2017 | Arfvidsson | .......... G06K 9/6277 |
| 2006/0251292 A1* | 11/2006 | Gokturk | ............ G06F 17/30253 382/103 |
| 2006/0251338 A1* | 11/2006 | Gokturk | ............ G06F 17/30253 382/305 |

(Continued)

*Primary Examiner* — Sean T Motsinger
(74) *Attorney, Agent, or Firm* — Cantor Colburn LLP; Grant Johnson

(57) ABSTRACT

Embodiments include methods, and mobile computing devices, and computer program products for creating personalized photo albums on mobile computing devices based on social media data. Aspects include: accessing, via mobile computing device, various photos taken by a user of mobile computing device, retrieving, from one or more social media streams, various media photos posted by user of the mobile computing device, extracting image features from the photos and the media photos, and text features from the media photos, generating photo clusters based on the image features of the photos, and media photo clusters based on the image features of the media photos, respectively, matching the photo clusters and the media photo clusters, tagging the photo clusters and the media photo clusters matched based on the text features extracted from the media photos, and generating a personalized photo album based on the photo clusters tagged and the media photo clusters tagged.

17 Claims, 3 Drawing Sheets

(56) References Cited

U.S. PATENT DOCUMENTS

| | | | |
|---|---|---|---|
| 2006/0251339 A1* | 11/2006 | Gokturk | G06F 17/30253 |
| | | | 382/305 |
| 2009/0097756 A1* | 4/2009 | Kato | G06F 17/30256 |
| | | | 382/190 |
| 2011/0188742 A1* | 8/2011 | Yu | G06K 9/6218 |
| | | | 382/159 |
| 2012/0233000 A1* | 9/2012 | Fisher | G06Q 30/02 |
| | | | 705/14.71 |
| 2012/0317115 A1* | 12/2012 | Naito | G06F 17/30265 |
| | | | 707/737 |
| 2012/0328190 A1* | 12/2012 | Bercovich | G06F 17/30268 |
| | | | 382/165 |
| 2014/0072242 A1* | 3/2014 | Wei | H04N 19/176 |
| | | | 382/299 |
| 2014/0258267 A1 | 9/2014 | Lin et al. | |
| 2014/0270407 A1* | 9/2014 | Balakrishnan | G06F 17/30256 |
| | | | 382/118 |
| 2014/0301653 A1* | 10/2014 | Murphy-Chutorian | |
| | | | G06K 9/00221 |
| | | | 382/224 |
| 2015/0043831 A1* | 2/2015 | Arfvidsson | H04L 67/10 |
| | | | 382/228 |
| 2015/0169571 A1 | 6/2015 | Farago et al. | |
| 2016/0048849 A1* | 2/2016 | Shiftan | G06F 17/30247 |
| | | | 705/7.29 |
| 2016/0275372 A1* | 9/2016 | Goodwin | G06K 9/6267 |
| 2017/0124434 A1* | 5/2017 | Goodwin | G06K 9/66 |
| 2017/0132821 A1* | 5/2017 | Valliani | G06F 17/241 |
| 2017/0185670 A1* | 6/2017 | Dua | G06F 17/30675 |
| 2017/0206420 A1* | 7/2017 | She | G06Q 50/01 |
| 2017/0249340 A1* | 8/2017 | Okuda | G06F 17/30268 |

* cited by examiner

US 10,346,466 B2

METHODS AND SYSTEMS OF PERSONALIZED PHOTO ALBUMS BASED ON SOCIAL MEDIA DATA

BACKGROUND

The present disclosure relates generally to mobile computing, and more particularly to methods and systems of personalized photo albums based on social media data.

Digital cameras on a mobile device become more and more popular in recent years. The number of photos we take each year has sky rocketed. In fact, in a recent presentation by Yahoo!, it was claimed that as many as 880 billions photos will be taken in 2014 if we continue on the current trend. Among them, a majority of the photos were taken by cameras on mobile devices such as smartphone and tablet computers. On the other hand, according to a rough estimation, over 1.5 billion new photos are shared every day on Facebook, WhatsApp and Snapchat alone, which equates to about 550 billions a year, and this is growing fast. Total sharing across all social networks, if we include Wechat and other platforms, is certain to be over 1 trillion this year-around 1.5 per smartphone per day.

There are at least a few hundreds, if not thousands, of photos on each smartphone or tablet computer. Categorizing, classifying and searching photos from a mobile device is a daunting task. Therefore it is desirable to build a personalized photo album on the mobile device based on even growing social media information readily available on the Internet, that is easy to browse and navigate and that has text or keyword search capability.

Therefore, heretofore unaddressed needs still exist in the art to address the aforementioned deficiencies and inadequacies.

SUMMARY

In an embodiment of the present invention, a method for creating a personalized photo album on a mobile computing device based on social media data may include: accessing, via the mobile computing device, various photos taken by a user of the mobile computing device, retrieving, from one or more social media streams, various media photos posted by the user of the mobile computing device, extracting image features from the photos and the media photos, and text features from the media photos, generating photo clusters based on the image features of the photos, and media photo clusters based on the image features of the media photos, respectively, matching the photo clusters and the media photo clusters, tagging the photo clusters and the media photo clusters matched based on the text features extracted from the media photos, and generating a personalized photo album based on the photo clusters tagged and the media photo clusters tagged.

In another embodiment of the present invention, a mobile computing device for creating a personalized photo album on a mobile computing device based on social media data may include a processor, and a memory storing computer executable instructions for the mobile computing device. When the computer executable instructions are executed at the processor, the computer executable instructions cause the mobile computing device to perform: accessing, via the mobile computing device, various photos taken by a user of the mobile computing device, retrieving, from one or more social media streams, various media photos posted by the user of the mobile computing device, extracting image features from the photos and the media photos, and text features from the media photos, generating photo clusters based on the image features of the photos, and media photo clusters based on the image features of the media photos, respectively, matching the photo clusters and the media photo clusters, tagging the photo clusters and the media photo clusters matched based on the text features extracted from the media photos, and generating a personalized photo album based on the photo clusters tagged and the media photo clusters tagged.

In yet another embodiment of the present invention, a non-transitory computer readable storage medium may store computer executable instructions. When the computer executable instructions are executed by a processor of a mobile computing device, the computer executable instructions cause the mobile computing device to perform: accessing, via the mobile computing device, various photos taken by a user of the mobile computing device, retrieving, from one or more social media streams, various media photos posted by the user of the mobile computing device, extracting image features from the photos and the media photos, and text features from the media photos, generating photo clusters based on the image features of the photos, and media photo clusters based on the image features of the media photos, respectively, matching the photo clusters and the media photo clusters, tagging the photo clusters and the media photo clusters matched based on the text features extracted from the media photos, and generating a personalized photo album based on the photo clusters tagged and the media photo clusters tagged.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
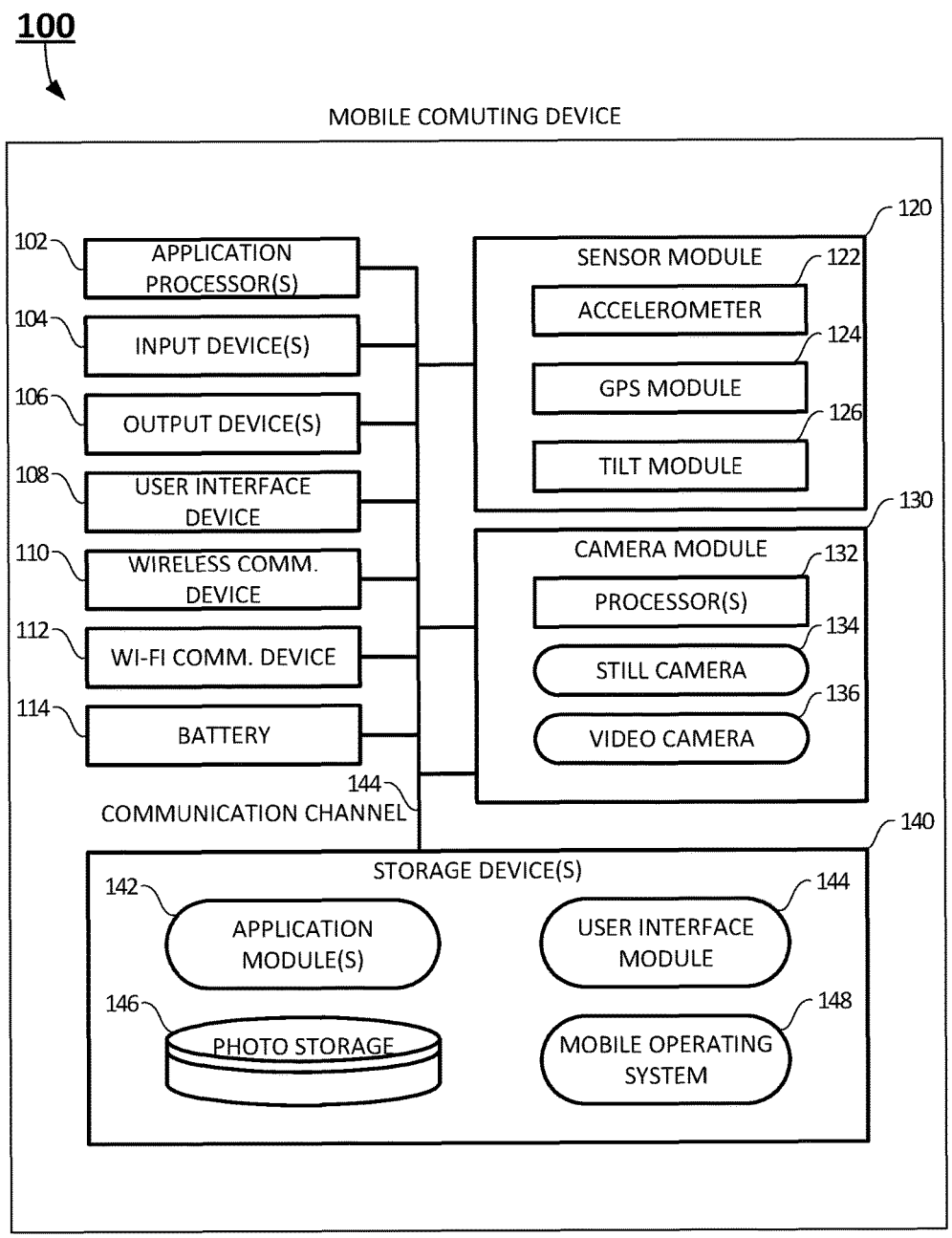
FIG. 1 is a block diagram of a mobile computing device according to one embodiment of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in"

includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The present disclosure will now be described more fully hereinafter with reference to the accompanying drawings FIGS. 1-3, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Referring to FIG. 1, there is shown an embodiment of a mobile computing device 100 for creating a personalized photo album on a mobile computing device based on social media data and implementing the teachings herein.

In certain embodiments, the mobile computing device 100 may include any number of different portable electronic computing devices, including, e.g., cellular phones, smartphones, personal digital assistants (PDAs), laptop computers, portable gaming devices, portable media players, google glasses, e-book readers, and wearable electronic devices such as smart watches. Mobile computing device 100 may include various input and output components, including, e.g. one or more processors, memory, telemetry modules, cellular network antennas, a display, one or more UI elements, sensors, and a power source like a rechargeable battery. In certain embodiments, the mobile computing device 100 may include access to the Internet, one or more cameras, and a storage device configured to store a plurality of photos taken by the one or more cameras.

In one embodiment, the mobile computing device 100 has one or more application processors, collectively or generically referred to as processors 102. The application processors 102 may include a single core processor, a multi-core processor. Processors 102 are coupled to one or more storage devices 140 and various other components via a communication channel 144. The storage devices 140 may include non-volatile read only memory (ROM), and volatile random access memory (RAM). The volatile RAM may be used to load and execute computer executable instructions. The storage devices 140 may be used to store various application modules 142, a user interface module 144, a mobile operating system 148, and a photo storage 146.

FIG. 1 further depicts an input device 104, an output device 106, and a user interface device 108. In certain embodiments, the input device 104, the output device 106, and the interface device 108 may be combined as a touch screen such as a display screen on a smartphone where a user can enter input through a virtual keyboard, the read the display, and interact with the mobile device all in the same time.

In certain embodiments, the mobile computing device 100 may include a wireless communication device 110 and a Wi-Fi communication device 112 allowing the mobile computing device 100 to access the Internet. A smartphone may include the wireless communication device 110 configured to communicate with a wireless network to access the Internet, and other mobile computing devices. Certain tablet computers may have no wireless communication device 110, but have the Wi-Fi communication devices 112.

In certain embodiments, the mobile computing device 100 may include a sensor module 120, and a camera module 130. The sensor module 120 may include an accelerometer 122 configured to detect movement of the mobile computing device 100, a GPS module 124 configured to receive real-time GPS coordinates of the mobile computing device 100, a tilt module 126 configured to detect the orientation of the mobile computing device 100. The camera module 130 may include an still camera module 134 configured to take still pictures, and a video camera 136 configured to take video recording. In certain embodiments, the mobile computing device 100 may include one or processors 132, and a microphone for sound recording.

In certain embodiments, mobile computing device 100 may include a user interface module 144. A user associated with mobile computing device 100 may interact with mobile computing device 100 by providing various user inputs into mobile computing device 100, e.g., using the user interface module 144. In some examples, the user interface module 144 may receive tactile, audio, or visual input. In addition to receiving input from a user, the user interface module 144 may output content, such as a graphical user interface (GUI) for display. In some examples, the user interface module 144 can include a display and/or a presence-sensitive input device. In some examples, the presence-sensitive input device and the display may be integrated into a presence-sensitive display, which displays the GUI and receives input from the user using capacitive, inductive, surface acoustic wave, and/or optical detection at or near the presence sensitive display. That is, the user interface module 144, in some examples may be a presence-sensitive display. In other examples, the display device can be physically separate from a presence-sensitive device included in mobile computing device 100.

In certain embodiments, mobile computing device 100 may include one or more application processors 104. One or more application processors 104 may implement functionality and/or execute instructions within mobile computing device 100. These instructions executed by application processors 104 may cause mobile computing device 100 to read/write/etc. information during program execution. Examples of one or more of application processors 104 may include one or more microprocessors, digital signal processors (DSPs), application specific integrated circuits (ASICs), field programmable gate arrays (FPGAs), or any other equivalent integrated or discrete logic circuitry, as well as any combinations of such components.

In certain embodiments, the storage device 140 may include one or more computer-readable storage media. The storage device 140 may store larger amounts of information than volatile memory. The storage device 140 may further be configured for long-term storage of information as non-volatile memory space and retain information after power on/off cycles. Examples of non-volatile memories may include, flash memories, solid state drive (SSD) or forms of electrically programmable memories (EPROM) or electrically erasable and programmable (EEPROM) memories. The storage device 140 may store program instructions and/or information (e.g., data) associated with application modules 142, the user interface module 144, a photo storage 146 and the mobile operating system 148.

In certain embodiments, the mobile operating system 148 controls the operation of components of mobile computing device 100. For example, the mobile operating system 148 facilitates the communication of application modules 142 with application processors 102, one or more input devices 104, one or more output devices 106, the user interface module 144, one or more sensors of the sensor module 120, and the camera module 130. Each of application modules 142 may include program instructions and/or data that are executable by the mobile computing device 100 (e.g., by one or more application processors 102). The mobile computing device 100 includes a battery 114 to provide power to one or more components of mobile computing device 100. Examples of battery 114 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. The battery 114 may have a limited capacity (e.g., 1000-3000 mAh).

Figure 2:
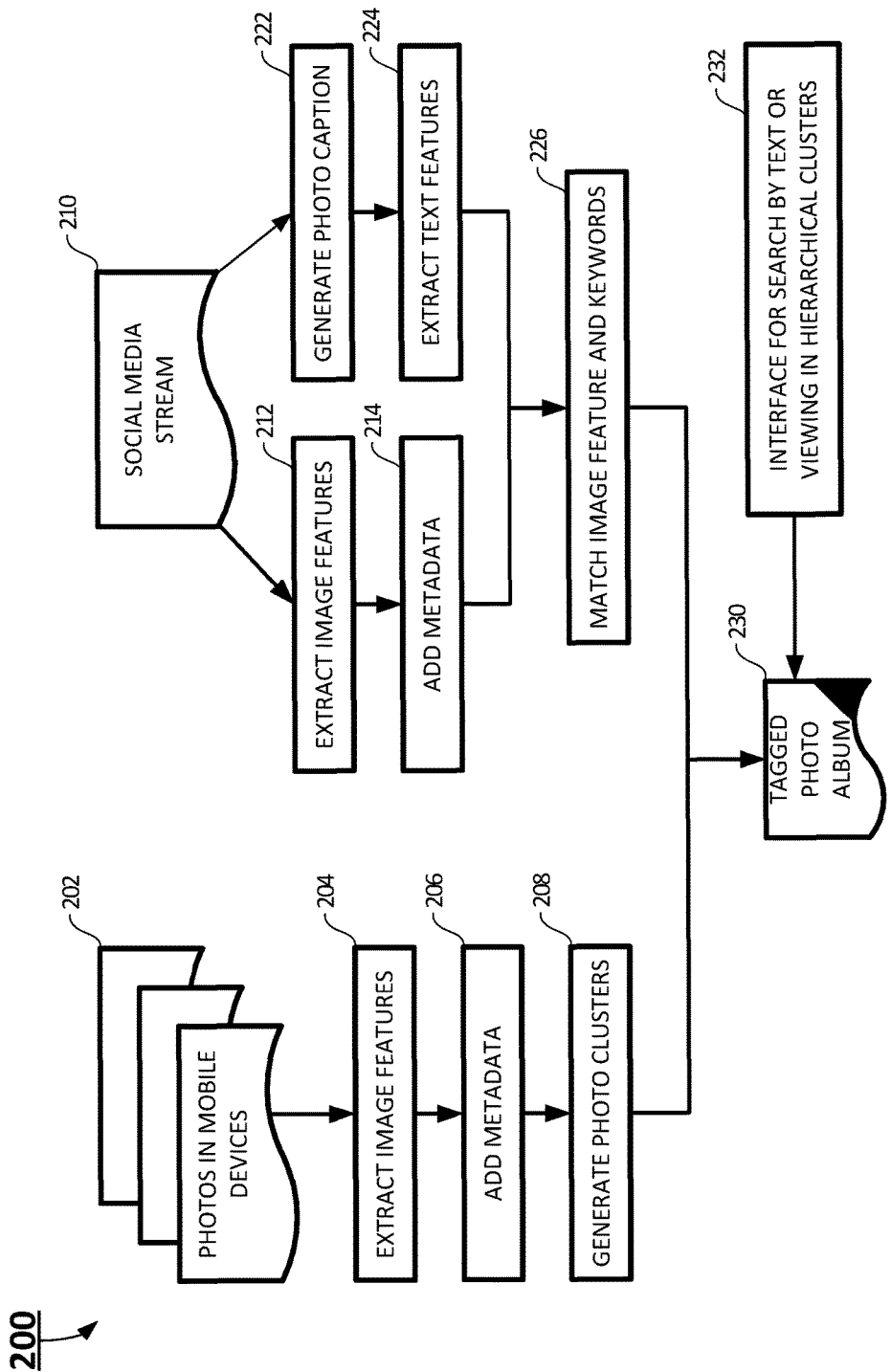
FIG. 2 is a flow chart of a method of creating personalized photo albums based on social media data according to one embodiment of the present invention.

Referring now to FIG. 2, a flow chart of a method 200 of creating personalized photo albums based on social media data is shown according to one embodiment of the present invention. In certain embodiments, the application modules 142 store software for the mobile computing device 100 for creating a personalized photo album on a mobile computing device 100 based on social media data. In certain embodiments, when the software is executed at the application processors 102, the mobile computing device 100 may perform one or more of the following:

At block 202, a user of the mobile computing device 100 may use the mobile computing device 100 to take many photos, and the photos taken are stored in the photo storage 146 of the storage device 140 of the mobile computing device 100.

At block 204, a photo album application module of the application modules 142 accesses the photos stored in the photo storage 146 of the storage device 140 of the mobile computing device 100, and performs analysis to extract certain image features of the photos.

In certain embodiments, the image features of a photo may include: a time when the photo was taken, a location where the photo was taken, a size of the photo, one or more tagged objects in the photo, one or more tagged people in the photo, and weights of one or more layers of a convolution neural networks. The image features may include a multi-dimensional vector space. Similarity of two photos is measured in Euclidean distance of corresponding vector spaces of the two photos. Once the image features of the photos are extracted, these image features are associated with each of the photos from the photo storage 146 of the storage device 140 of the mobile computing device 100.

At block 206, certain metadata may be added to each of the photos if available. The metadata of a photo may include information about the photo, including brand of a camera used to take the photo, a lens of the camera, the exposure information, whether a flash light is used, focus information, data and time when the photo was taken, file size and format of the photo, and color encoding etc.

At block 208, the photo album application module may group one or more photos from the photo storage 146 of the storage device 140 of the mobile computing device 100 to form various photo clusters. In one embodiment, the one or more photos from the photo storage 146 of the storage device 140 of the mobile computing device 100 are grouped according to the date, the time, and the location of the photos.

At block 210, the photo album application module may retrieve various media photos from one or more social media streams where the user usually posts photos. Exemplary social media streams may include Facebook, WhatsApp, Instagram, Google Plus+, Flickr, classmates, and WeChat.

At block 212, the photo album application module may perform analysis to extract certain image features of the media photos retrieved at block 210.

At block 214, certain metadata may be added to each of the photos if available similar to the procedure performed at the block 206.

At block 222, in one embodiment, the photo album application module may generate certain photo captions of the media photos according to information retrieved from the one or more social media streams. In another embodiment, the photo album application module may prompt the user to manually enter certain text information directly related to the media photos.

At block 224, the photo album application module may perform analysis to extract certain image features of the media photos retrieved at block 210.

At block 226, the photo album application module may associate the image features of the media photos with the text features of the media photos, and group one or more media photos according to the date, time, and location of the one or more media photos to form one or more media photo clusters.

At block 230, the photo album application module may go through each of the one or more photo clusters and one or more media photo clusters to associate the or more photo clusters with the one or more media photo clusters and tag the associated photo clusters with the text features extracted from the media photos to form the personalized photo album.

At block 232, the photo album application module may provide a user friendly user interface for the user to search by text, and keywords, and to allow user to browse and navigate in a hierarchical and tagged structure. The tagged personalized photo album has captions, titles, and headlines such that the user may find it easy to browse and navigate.

Figure 3:
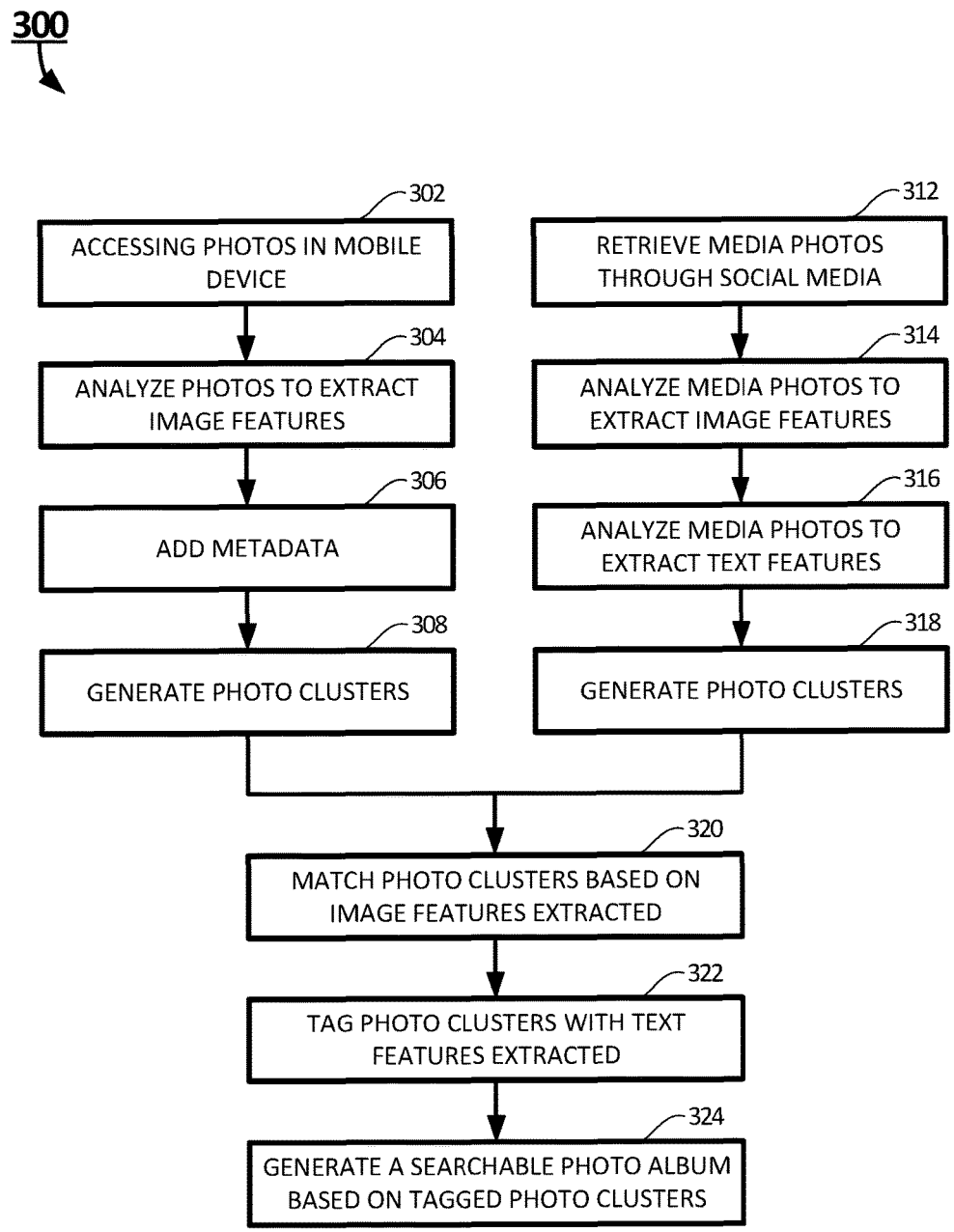
FIG. 3 is another flow chart of a method of creating personalized photo albums based on social media data according to another embodiment of the present invention.

Referring now to FIG. 3, a flow chart of a method 300 of creating personalized photo albums based on social media data is shown according to one embodiment of the present invention. In certain embodiments, the application modules 142 store software for the mobile computing device 100 for creating a personalized photo album on a mobile computing device 100 based on social media data. In certain embodiments, when the software is executed at the application processors 102, the mobile computing device 100 may perform one or more of the following:

At block 302, a user of the mobile computing device 100 may use the mobile computing device 100 to take many photos, and the photos taken are stored in the photo storage 146 of the storage device 140 of the mobile computing device 100. A photo album application module of the application modules 142 may access the photos stored in the photo storage 146 of the storage device 140 of the mobile computing device 100.

At block 304, the photo album application module may perform analysis of the photos to extract certain image features of the photos stored in the photo storage 146 of the storage device 140 of the mobile computing device 100.

In certain embodiments, the image features of a photo may include: a time when the photo was taken, a location where the photo was taken, a size of the photo, one or more tagged objects in the photo, one or more tagged people in the photo, and weights of one or more layers of a convolution neural networks. The image features may include a multi-dimensional vector space. Similarity of two photos is measured in Euclidean distance of corresponding vector spaces of the two photos. Once the image features of the photos are extracted, these image features are associated with each of the photos from the photo storage 146 of the storage device 140 of the mobile computing device 100.

At block 306, certain metadata may be added to each of the photos if available. The metadata of a photo may include information about the photo, including brand of a camera used to take the photo, a lens of the camera, the exposure information, whether a flash light is used, focus information, data and time when the photo was taken, file size and format of the photo, and color encoding etc.

At block 308, the photo album application module may group one or more photos from the photo storage 146 of the storage device 140 of the mobile computing device 100 to form various photo clusters. In one embodiment, the one or more photos from the photo storage 146 of the storage device 140 of the mobile computing device 100 are grouped according to the date, the time, and the location of the photos.

At block 312, the photo album application module may retrieve various media photos from one or more social media streams where the user usually posts photos. Exemplary social media streams may include Facebook, WhatsApp, Instagram, Google Plus+, Flickr, classmates, and WeChat.

At block 314, the photo album application module may perform analysis to extract certain image features of the media photos retrieved at block 312.

At block 316, certain metadata may be added to each of the photos if available similar to the procedure performed at the block 206.

At block 318, the photo album application module may group the media photos into various photo clusters according to the date, time, and location of the media photos. In one embodiment, the photo album application module may generate certain photo captions of the media photos according to information retrieved from the one or more social media streams. In another embodiment, the photo album application module may prompt the user to manually enter certain text information directly related to the media photos. In certain embodiments, the photo album application module may associate the image features of the media photos with the text features of the media photos, and group one or more media photos according to the date, time, and location of the one or more media photos to form one or more media photo clusters.

At block 320, the photo album application module may go through each of the one or more photo clusters and the one or more media photo clusters to associate the one or more photo clusters with the one or more media photo clusters.

At block 322, the photo album application module may tag the associated photo clusters with the text features extracted from the media photos.

At block 324, the photo album application module may use the tagged and associated photo clusters to form the personalized photo album. The photo album application module may provide a user friendly user interface for the user to search by text, and keywords, and to allow user to browse and navigate in a hierarchical and tagged structure. The tagged personalized photo album has captions, titles, and headlines such that the user may find it easy to browse and navigate In another embodiment of the present invention, a mobile computing device for creating a personalized photo album on a mobile computing device based on social media data may include a memory storing computer executable instructions for the mobile computing device, and a processor for executing the computer executable instructions. When the computer executable instructions are executed at the processor, the computer executable instructions cause the mobile computing device to perform: accessing, via the mobile computing device, various photos taken by a user of the mobile computing device, retrieving, from one or more social media streams, various media photos posted by the user of the mobile computing device, extracting image features from the photos and the media photos, and text features from the media photos, generating photo clusters based on the image features of the photos, and media photo clusters based on the image features of the media photos, respectively, matching the photo clusters and the media photo clusters, tagging the photo clusters and the media photo clusters matched based on the text features extracted from the media photos, and generating a personalized photo album based on the photo clusters tagged and the media photo clusters tagged.

In yet another embodiment of the present invention, a non-transitory computer readable storage medium may store computer executable instructions. When the computer executable instructions are executed by a processor of a mobile computing device, the computer executable instructions cause the mobile computing device to perform: accessing, via the mobile computing device, various photos taken by a user of the mobile computing device, retrieving, from one or more social media streams, various media photos posted by the user of the mobile computing device, extracting image features from the photos and the media photos, and text features from the media photos, generating photo clusters based on the image features of the photos, and media photo clusters based on the image features of the media photos, respectively, matching the photo clusters and the media photo clusters, tagging the photo clusters and the media photo clusters matched based on the text features extracted from the media photos, and generating a personalized photo album based on the photo clusters tagged and the media photo clusters tagged.

The present invention may be a mobile computing device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of creating a personalized photo album on a mobile computing device based on social media data, comprising:

accessing, by a processor, a plurality of photos stored on the mobile computing device, wherein the plurality of photos were taken by a user of the mobile computing device;

retrieving, by the processor, a plurality of media photos from one or more social media streams for the user, wherein the plurality of media photos were posted by the user of the mobile computing device;

extracting, by the processor, a plurality of image features from the plurality of photos and the plurality of media photos, and a plurality of text features from the plurality of media photos, wherein the image features of the plurality of photos and image features of the plurality of media photos each include a time when each photo was taken and a location where each photo was taken, and wherein the text features comprise a name of each tagged person in the plurality of photos and a name of each tagged object in the plurality of photos;

generating, by the processor, a plurality of photo clusters based on the plurality of image features of the plurality of photos, and a plurality of media photo clusters based on the plurality of image features of the plurality of media photos, respectively;

matching, by the processor, the plurality of photo clusters and the plurality of media photo clusters;

tagging, by the processor, the plurality of photo clusters with the plurality of text features extracted from the plurality of media photos;

generating, by the processor, a personalized photo album on the mobile computing device based on the plurality of photo clusters tagged and the plurality of media photo clusters tagged; and displaying the personalized photo album on the mobile computing device, wherein the personalized photo album is browseable and navigable based on a tagged structure associated with the personalized photo album.

2. The method of claim 1, wherein the mobile computing device comprises at least one of:
a cellular phone;
a smartphone;
a personal digital assistant (PDA);
a tablet;
a laptop computer;
a portable gaming device;
a portable media player;
a google glass; and
a wearable electronic device,
wherein the mobile computing device comprises: access to the Internet, one or more cameras, and a storage device configured to store a plurality of photos taken by the one or more cameras.

3. The method of claim 1, wherein the plurality of image features of a photo further comprises at least one of:
a size of the photo;
one or more tagged objects in the photo;
one or more tagged people in the photo; and
a plurality of weights of one or more layers of a convolution neural networks,
wherein the image features comprise a multi-dimensional vector space, and a similarity of two photos is measured in Euclidean distance of corresponding vector spaces of the two photos.

4. The method of claim 1, wherein the generating photo clusters comprises:
grouping one or more photos from the plurality of photos according to the date, time and location of the one or more photos; and
grouping one or more media photos from the plurality of media photos according to the date, time and location of the one or more media photos.

5. The method of claim 4, wherein the matching comprises:
calculating an Euclidean distance of a photo cluster and a media photo cluster; and
determining a match between the photo cluster and the media photo cluster when the Euclidean distance of the photo cluster and the media photo cluster is less than a predetermined threshold.

6. The method of claim 1 further comprising generating photo caption, wherein a photo caption of a media photo comprises:
one or more lines of text associated with the media photo; and
one or more lines of text manually entered by the user.

7. The method of claim 1, wherein the personalized photo album comprises:
a hierarchical structure in photo clusters; and
a user interface having text and keywords search capability.

8. A mobile computing device comprising a memory storing computer executable instructions for the mobile computing device, and a processor for executing the computer executable instructions, the computer executable instructions including:
accessing a plurality of photos stored on the mobile computing device, wherein the plurality of photos were taken by a user of the mobile computing device;
retrieving a plurality of media photos from one or more social media streams for the user, wherein the plurality of media photos were posted by the user of the mobile computing device;
extracting a plurality of image features from the plurality of photos and the plurality of media photos, and a plurality of text features from the plurality of media photos, wherein the image features of the plurality of photos and image features of the plurality of media photos each include a time when each photo was taken and a location where each photo was taken, and wherein the text features comprise a name of each tagged person in the plurality of photos and a name of each tagged object in the plurality of photos;
generating a plurality of photo clusters based on the plurality of image features of the plurality of photos, and a plurality of media photo clusters based on the plurality of image features of the plurality of media photos, respectively;
matching the plurality of photo clusters and the plurality of media photo clusters;
tagging the plurality of photo clusters with the plurality of text features extracted from the plurality of media photos;
generating a personalized photo album on the mobile computing device based on the plurality of photo clusters tagged and the plurality of media photo clusters tagged; and
displaying the personalized photo album on the mobile computing device, wherein the personalized photo album is browseable and navigable based on a tagged structure associated with the personalized photo album.

9. The mobile computing device of claim 8, wherein the mobile computing device comprises at least one of:
a cellular phone;
a smartphone;
a personal digital assistant (PDA);
a tablet;
a laptop computer;
a portable gaming device;

a portable media player;
a google glass; and
a wearable electronic device,
wherein the mobile computing device comprises: access to the Internet, one or more cameras, and a storage device configured to store a plurality of photos taken by the one or more cameras.

10. The mobile computing device of claim 8, wherein the plurality of image features of a photo further comprises at least one of:
a size of the photo;
one or more tagged objects in the photo;
one or more tagged people in the photo; and
a plurality of weights of one or more layers of a convolution neural networks,
wherein the image features comprise a multi-dimensional vector space, and a similarity of two photos is measured in Euclidean distance of corresponding vector spaces of the two photos.

11. The mobile computing device of claim 8, wherein the generating photo clusters comprises:
grouping one or more photos from the plurality of photos according to the date, time and location of the one or more photos; and
grouping one or more media photos from the plurality of media photos according to the date, time and location of the one or more media photos.

12. The mobile computing device of claim 11, wherein the matching comprises:
calculating an Euclidean distance of a photo cluster and a media photo cluster; and
determining a match between the photo cluster and the media photo cluster when the Euclidean distance of the photo cluster and the media photo cluster is less than a predetermined threshold.

13. A non-transitory computer program product operable on a mobile computing device for creating a personalized photo album on the mobile computing device based on social media data comprising a computer readable storage medium having computer executable instructions embodied therewith, the computer executable instructions executable by a processor located on the mobile computing device to cause the processor to perform:
accessing a plurality of photos stored on the mobile computing device, wherein the plurality of photos were taken by a user of the mobile computing device;
retrieving a plurality of media photos from one or more social media streams for the user, wherein the plurality of media photos were posted by the user of the mobile computing device;
extracting a plurality of image features from the plurality of photos and the plurality of media photos, and a plurality of text features from the plurality of media photos, wherein the image features of the plurality of photos and image features of the plurality of media photos each include a time when each photo was taken and a location where each photo was taken, and wherein the text features comprise a name of each tagged person in the plurality of photos and a name of each tagged object in the plurality of photos;
generating a plurality of photo clusters based on the plurality of image features of the plurality of photos, and a plurality of media photo clusters based on the plurality of image features of the plurality of media photos, respectively;
matching the plurality of photo clusters and the plurality of media photo clusters;
tagging the plurality of photo clusters with the plurality of text features extracted from the plurality of media photos; and
generating a personalized photo album on the mobile computing device based on the plurality of photo clusters tagged and the plurality of media photo clusters tagged; and
displaying the personalized photo album on the mobile computing device, wherein the personalized photo album is browseable and navigable based on a tagged structure associated with the personalized photo album.

14. The non-transitory computer program product of claim 13, wherein the mobile computing device comprises at least one of:
a cellular phone;
a smartphone;
a personal digital assistant (PDA);
a tablet;
a laptop computer;
a portable gaming device;
a portable media player;
a google glass; and
a wearable electronic device,
wherein the mobile computing device comprises: access to the Internet, one or more cameras, and a storage device configured to store a plurality of photos taken by the one or more cameras.

15. The non-transitory computer program product of claim 13, wherein the plurality of image features further comprises at least one of:
a size of the photo;
one or more tagged objects in the photo;
one or more tagged people in the photo; and
a plurality of weights of one or more layers of a convolution neural networks,
wherein the image features comprise a multi-dimensional vector space, and a similarity of two photos is measured in Euclidean distance of corresponding vector spaces of the two photos.

16. The non-transitory computer program product of claim 13, wherein the generating photo clusters comprises:
grouping one or more photos from the plurality of photos according to the date, time and location of the one or more photos; and
grouping one or more media photos from the plurality of media photos according to the date, time and location of the one or more media photos.

17. The non-transitory computer program product of claim 16, wherein the matching comprises:
calculating an Euclidean distance of a photo cluster and a media photo cluster; and
determining a match between the photo cluster and the media photo cluster when the Euclidean distance of the photo cluster and the media photo cluster is less than a predetermined threshold.

\* \* \* \* \*